United States Patent [19]

Feist

[11] 3,878,063

[45] Apr. 15, 1975

[54] METHOD FOR MAKING A THIN FILM DIELECTRIC STORAGE TARGET

[75] Inventor: Wolfgang M. Feist, Burlington, Mass.

[73] Assignee: Raytheon Company, Lexington, Mass.

[22] Filed: Dec. 26, 1973

[21] Appl. No.: 427,742

Related U.S. Application Data

[60] Continuation of Ser. No. 208,494, Dec. 15, 1971, abandoned, which is a division of Ser. No. 355,855, April 30, 1973, which is a continuation of Ser. No. 210,095, Dec. 20, 1971, abandoned, which is a continuation of Ser. No. 12,566, Feb. 19, 1970, abandoned, which is a continuation-in-part of Ser. No. 806,534, March 12, 1969, abandoned.

[52] U.S. Cl. ........................ 204/15; 96/44; 117/99; 117/212

[51] Int. Cl. ........................ C23b 5/48

[58] Field of Search ............. 204/24, 15, 11; 96/44; 117/212, 99

[56] References Cited

UNITED STATES PATENTS

| | | | |
|---|---|---|---|
| 2,118,186 | 5/1938 | Farnsworth | 117/99 |
| 2,216,264 | 10/1940 | Farnsworth | 117/212 |
| 2,415,842 | 2/1947 | Oliver | 204/15 |
| 2,858,463 | 10/1958 | Koda et al. | 204/15 |
| 3,414,435 | 12/1968 | Patterson et al. | 117/212 |
| 3,561,964 | 2/1971 | Slaten | 96/44 |

*Primary Examiner*—T. M. Tufariello

*Attorney, Agent, or Firm*—Joseph D. Pannone; Milton D. Bartlett; John R. Inge

[57] ABSTRACT

A membrane type dielectric storage target formed from a thin refractory dielectric film is stretched to form at least a one-sided surface, a first surface portion contacting a conductive wire mesh, a second surface portion having areas coated with conductive material imaging the mesh of the first surface portion. The method contemplates forming the conductive image on the second surface portion by photo-resist, decoration, and breakdown techniques.

4 Claims, 7 Drawing Figures

METHOD FOR MAKING A THIN FILM DIELECTRIC STORAGE TARGET

This is a continuation of application Ser. No. 208,494 filed Dec. 15, 1971 (now abandoned), which is a division of application Ser. No. 355,855 filed Apr. 30, 1973, which is a continuation of application Ser. No. 210,095 filed Dec. 20, 1971 (now abandoned), which is continuation of application Ser. No. 12,566 filed Feb. 19, 1970 (now abandoned, which is a continuation in part of application Ser. No. 806,534 filed Mar. 12, 1969 (now abandoned).

BACKGROUND OF THE INVENTION

This invention relates to dielectric storage targets and, more particularly, to membrane type dielectric storage targets and methods for fabricating same.

Dielectric storage films have been used to coat apertured conductive target electrodes in electron beam storage tubes. Such electrodes may take the form of fine wire mesh grids. There are many wire mesh target electrode structures shown in the prior art. Frequently, these structures exhibit thick film dielectric layers contiguous to the wire mesh, the mesh apertures being plugged with conductive material. The metal plugs are inserted in order to offset the combined capacitance effects of the metal mesh and the thin dielectric film coatings. In this regard, reference may be made to Teal (U.S. Pat. No. 2,650,101) and H. R. Day (U.S. Pat. Nos. 3,020,433 and 3,116,191). Such prior art structures, however, do not relieve the mechanical stress exerted by the film on the supporting mesh. Also, the use of metal plugs to correct thick film capacitance distertion increases rather than decreases the mechanical burden carried by the wire mesh.

It is, accordingly, an object of this invention to devise a dielectric storage target electrode in which mechanical stress on a supporting mesh is minimized. Relatedly, it is desired to reduce the leakage of charge as well as the capacitance formed by the dielectric membrane element to the surrounding conducting mesh.

In the prior art, the forming of conductive surfces on either side of a dielectric has required the use only of those dielectrics through which metal will diffuse at elevated temperatures. Thus, a nickel mesh with a gold coating covered with a zinc sulphide dielectric layer permits the gold from the nickel to diffuse through the dielectric onto the other side. Unfortunately, dielectrics such as zinc sulphide are relatively poor and exhibit undesirably high leakage currents if the operating temperature exceeds room temperature. Dielectric membranes formed from higher quality dielectric materials do not readily permit diffusion of a metal therethrough.

It is, accordingly, another object of this invention to devise a membrane type dielectric storage target and method for making same in which the wire mesh support on one surface of the film is exactly imaged on another portion of the dielectric film and further that the dielectric be of high quality. Relatedly, it is desired that the method for fabrication should not be dependent upon the diffusion of metal through the dielectric portion of the target.

SUMMARY

The aforementioned objects are satisfied in several preferred embodiments and methods for making same. The invention contemplates a membrane type dielectric storage target in which a thin refractory dielectric film, such as boron nitride, is stretched to form a surface to which a conductive wire mesh contiguously and intimately contacts at least a portion of the surface with a conductive image of the wire mesh contiguously and intimately contacting at least another portion of the surface. The membrane may be stretched to form a large variety of topologic surfaces such as a Moebius Band, a Klein Bottle, or a Trefoil Knot, in addition to the conventional planar matrix shape.

More prosaically, the dielectric film is stretched to form merely an inside and outside surface. In this embodiment, the conductive wire mesh contiguously and intimately contacts at least a portion of the inner surface. Likewise, the conductive image of the wire mesh contiguously and intimately contacts at least a portion of the outer surface.

The method for fabricating the membrane type dielectric storage target comprises the steps of coating the metal mesh with a lacquer layer and depositing a thin refractory dielectric film over the lacquer coated mesh. Subsequently, the lacquer layer is removed, as by applying heat to the film. Significantly, an image of the mesh is formed on another surface of the refractory dielectric film using photo-resist, decoration, and electrical breakdown techniques. Lastly, a conductive metal grid is formed on the image portions of the surface in the case of photolithographic techniques.

DESCRIPTION OF THE PREFERRED EMBODIMENTS

As previously discussed in co-pending U.S. Patent Application Ser. No. 806,534, dielectric storage targets are used in electron memory tubes. The information is written on the targets by an electron beam. Operationally, the electron base charges different areas of the target to the same or different potentials. The information is then read from the target by the same electron beam or a different electron beam, and at a speed which may be substantially different from the writing or energizing process. In the ensuing paragraphs, attention shall first be directed to a number of different geometric embodiments of the membrane target. This will be followed by a discussion of the fabrication of a planar matrix target according to the invention.

The target for dielectric storage has a variety of embodiments which, for example, may consist of a dielectric layer formed on a conducting substrate, a dielectric layer formed on a mesh in such fashion that it partly fills the apertures of the mesh, and a conducting mesh over whose entire area a dielectric film is laid down. In this latter structure, the mesh apertures are filled with membranes. In addition to these conventional forms, the invention also contemplates that the dielectric film be cast in a number of different topologic shapes including onesided surfaces such as the Moebium Band, the Klein Bottle, and the Trefoil knot.

Figure 4A:
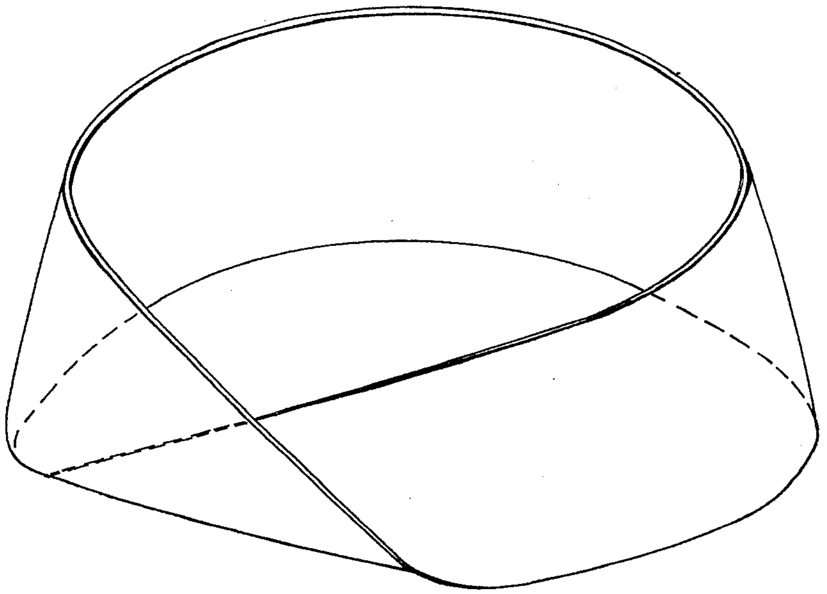
FIGS. 4A, 4B, and 4C illustrate alternative topologic surfaces, in addition to a planar surface, into which the membrane may be formed.
Figure 4B:
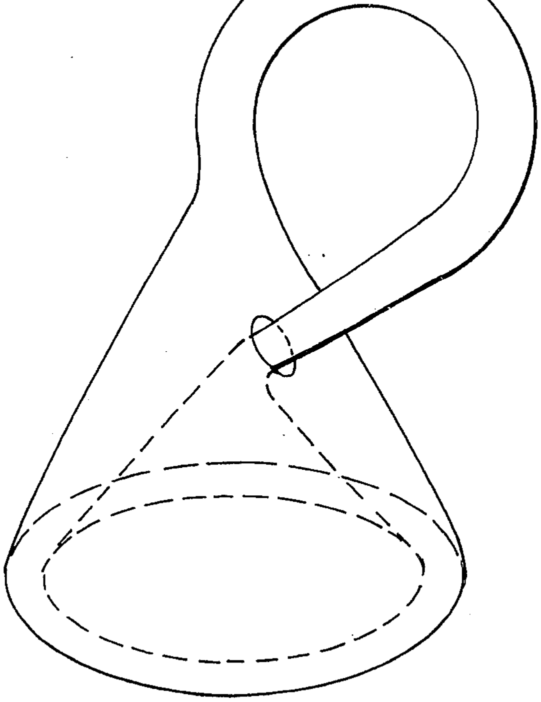
Figure 4C:
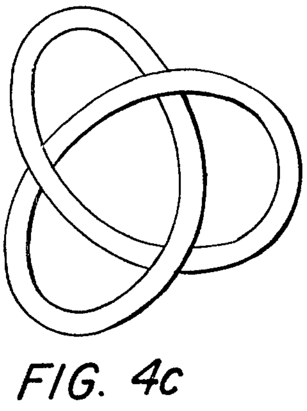

Referring now to FIG. 4A, there is shown a drawing of a Moebius Band. The film may be conveniently shaped in the form of a rectangular strip, given a half twist with the two ends attached together. The resulting film surface has only one side instead of two. To form a Klein Bottle as shown in FIG. 4B, the film is shaped analogous to an inner tube and cut through and straightened out like a cylinder. One end is stretched out to make a base and the other end narrowed like the neck of a bottle. Then the narrow end is twisted over and thrust through the equivalent of a valve stem hole in the side of the tube and finally is flared out and joined with the open end at the base. Referring now to FIG. 4C, there is a Trefoil Knot form of the dielectric film which may be constructed by giving a appropriate Moebius Band of FIG. 4C three half twists and flattening the band and tracing a path of its edge.

It is to be understood that the thin film would have attached along one portion of its surface extent an integral self-supporting metal structure in the form of a conductive wire mesh defining a plurality of apertures. The dielectric film, made preferably from boron nitride, contiguously and intimately contacts the mesh including the apertures. A conductive image of the wire mesh which also contiguously and intimately contacts another portion of the thin film surface completes the basic membrane type storage target. Of course, the film may be shaped as a conventional flat surface in which the wire mesh contacts the film on one side and the conductive image contacts the film on the other side. The wire mesh and its conductive image may, of course, be oppositely disposed one from the other, or for a portion of their extents spatially overlapping. In the case of the one-sided surface, the mesh and its conductive image would occupy distinct non-overlapping surface portions.

The membrane type storage structure of this invention may be made as thin as 1,000 to 3,000 Angstroms when fabricated according to the hereinafter to be described methods. It is well to consider the advantages that derive from thin membrane type storage targets. First, the deposition time for forming the dielectric films is kept to a minimum. Second, the stresses exerted by the dielectric film on the supporting mesh are reduced due to a smaller mass of film. Third, the leakage current, as well as the capacitance from a dielectric membrane element to the surrounding conducting mesh, is small. This is because of the thinness of the film and the relatively large spacing between the mesh wires. An added benefit deriving from the small capacitance is that the writing speed of the electron beam upon the target may be substantially increased.

In the prior art, dielectric storage screesn were fabricated according to the following steps. First, a nickel wire mesh in the order of 750 to 1,000 meshes per inch was immersed in a tank filled with nitrocellulose lacquer. After removal from the tank, the excess lacquer was spun off the mesh and the remaining lacquer dried to form a membrane covering the screen. A dielectric film was then deposited over the lacquer membrane. Subsequently, the lacquer was removed by heating the mesh in air. For proper functioning as a storage target, it was mandatory that the conducting grid present only on the substrate side of the dielectric film would have to be duplicated in perfect alignment on the outer surface of the dielectric. It was necessary to coat the nickel mesh with a thin layer of a suitable metal such as gold before forming the lacquer membrane. The dielectric was restricted to only those materials which would permit diffusion of the metal at elevated temperatures as for example zinc sulphide. After the dielectric membrane was formed, the screen was heated for a period of time to a suitable temperature. This elevated temperature resulted in the gold diffusing from the grid wires to the opposite surface of the dielectric.

It must be clearly recognized that materials such as zinc suplphide permitting diffusion are comparatively poor dielectrics. Indeed, storage screens fabricated from zinc sulphide exhibit high dielectric leakage at operating temperatures exceeding 20°C to 30°C. As previously suggested, membranes formed with higher quality dielectric materials do not readily permit diffusions of a metal and consequently cannot be used for dielectric storage target fabrication purposes.

Figure 1:
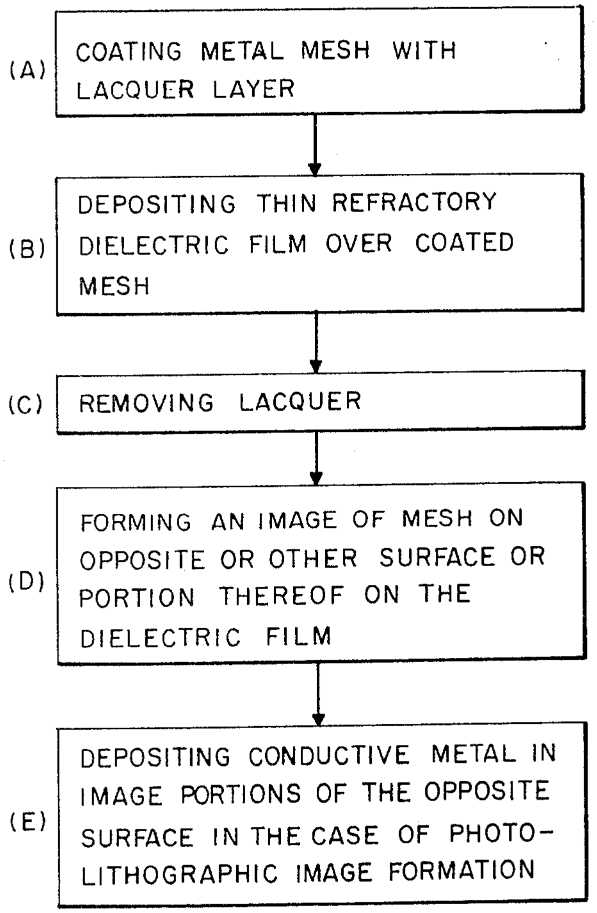
FIG. 1 is a generalized flow diagram.
Figure 2:
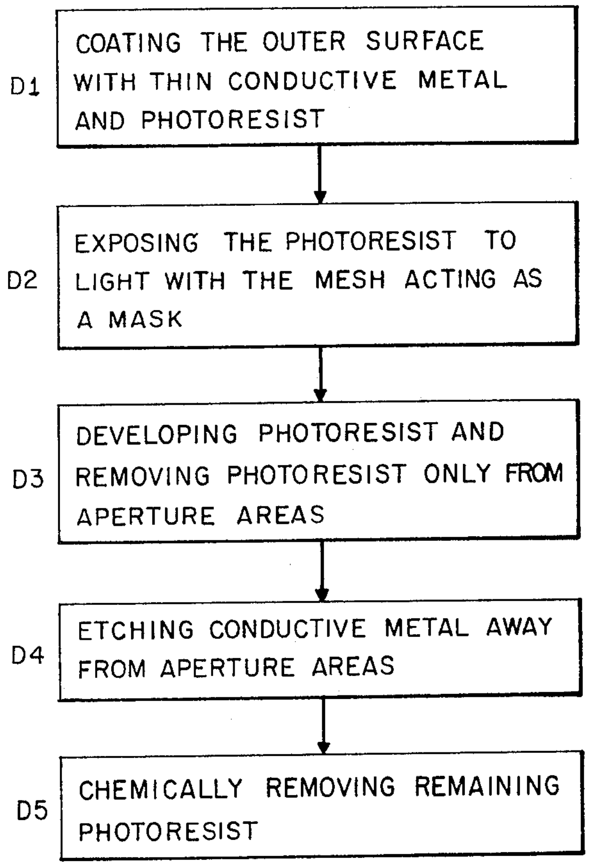
FIG. 2 is a flow diagram of the photo-resist method of fabricating the membrane storage target.
Figure 3:
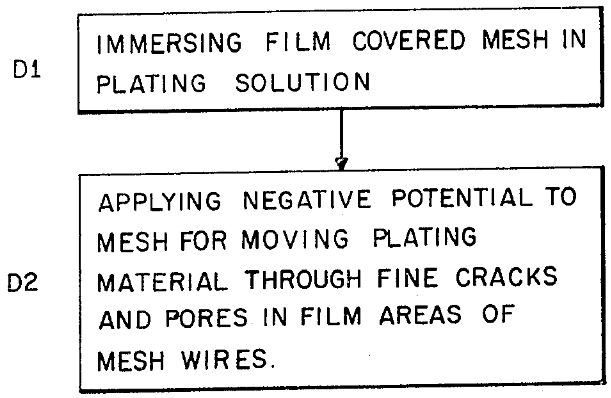
FIG. 3 is a flow diagram of the decoration method of fabricating the membrane storage target.

Referring now to FIGS. 1, 2, and 3, there are shown respectively flow diagrams of the process steps for making the thin film membranes according to the invention. With attention now to FIG. 1, there are shown five basic steps in forming a conductive image of the dielectric film on another portion of the same surface as well as diametrically opposite the mesh.

The metal mesh is first coated with a supporting layer such as, for example, nitrocellulose. A thin refractory dielectric film such as boron nitride is deposited on the lacquer coated mesh. The nitrocellulose lacquer base is removed, for example, by applying heat to the refractory covered mesh. An image of the mesh is made opposite or upon another surface or portion thereof on the dielectric film. Lastly, a conductive metal grid is formed on the image portions of the mesh when a photolithagraphic process is used.

Referring now to FIG. 2 of the drawing, there are shown the detailed steps of image formation utilizing a photo-resist technique. After the lacquer has been removed, the outer or other surface portion of the dielectric film is coated first with a thin conductive metallic film in the range between 200 Angstroms to 500 Angstroms of, for example, gold. Next, a photo-resist layer is spun over the gold and subjected to proper drying and baking. The photo-resist layer is exposed to suitable light such as ultraviolet with the mesh acting as a mask. The exposed photo-resist is then developed and removed only from aperture areas. Now, the gold film is etched away from the aperture areas. Aurostrip was found to be a suitable etchant because it removes the gold without attacking the mesh metal. Lastly, the remaining photo-resist is chemically removed such as by chemical stripping, heating in air, or exposure to an oxygen plasma.

A variation of this technique is also useful. Thus, after the dielectric membrane is formed, the photoresist is put on, exposed, and developed. This results in photo-resist covering the areas opposite the apertures in the mesh only. Next, a thin gold film is deposited on the side of the outer face or other surface portion of the dielectric membrane. Lastly, the remaining photoresist is chemically stripped, a process which also washes off the gold film form the areas opposite the mesh apertures.

Referring now to FIG. 3, there is shown a second technique for producing an image of the conductive mesh on the opposite or other surface portion of the dielectric film. Again, after formation of the dielectric membrane and the removal of the lacquer layer, the mesh is immersed in a plating solution of, for example, copper or gold with a negative potential being applied to the mesh. As a result, the copper or gold plates through any pinholes or fine cracks in the dielectric film. However, this only occurs in areas over the mesh wires. This method presupposes the existence of a sufficient number of pinholes in the thin dielectic film. Such a number may be created artificially as, for example, by using a mesh whose wires have a relatively rough surface or by spraying a fine silica or boron nitride dust over the mesh before deposition of the dielectric.

In practice, a plating bath was set up in which the gravity of the bath was adjusted to 16° Baume, the pH level being 4.5 and the temperature being 560° Rankin. The distance between a 2-inch by 3-inch stainless steel anode and the sample was between 1 to 2 inches. It was desired to plate a 2-inch diameter, 1,000 mesh grid coated with a BN membrane between 2,000 Angstroms to 3,000 Angstroms thickness. This was attained with a current level of between 40 to 50 milliamperes for a period of between 2 to 10 minutes. The potential required to achieve this deposition was in the order of 1 to 5 volts.

Lastly, a breakdown technique may be used. First, the dielectric membrane is formed and the lacquer layer is removed. One side of the screen is protected by lacquer and the front of the film exposed to an electrolyte or a plasma. The electrolyte or plasma makes it possible to apply a potential across the dielectric film which is sufficiently high to cause the desired breakdown to occur at areas over the grid wires. Removal of the lacquer coating by baking in air completes the process.

Figure 5:
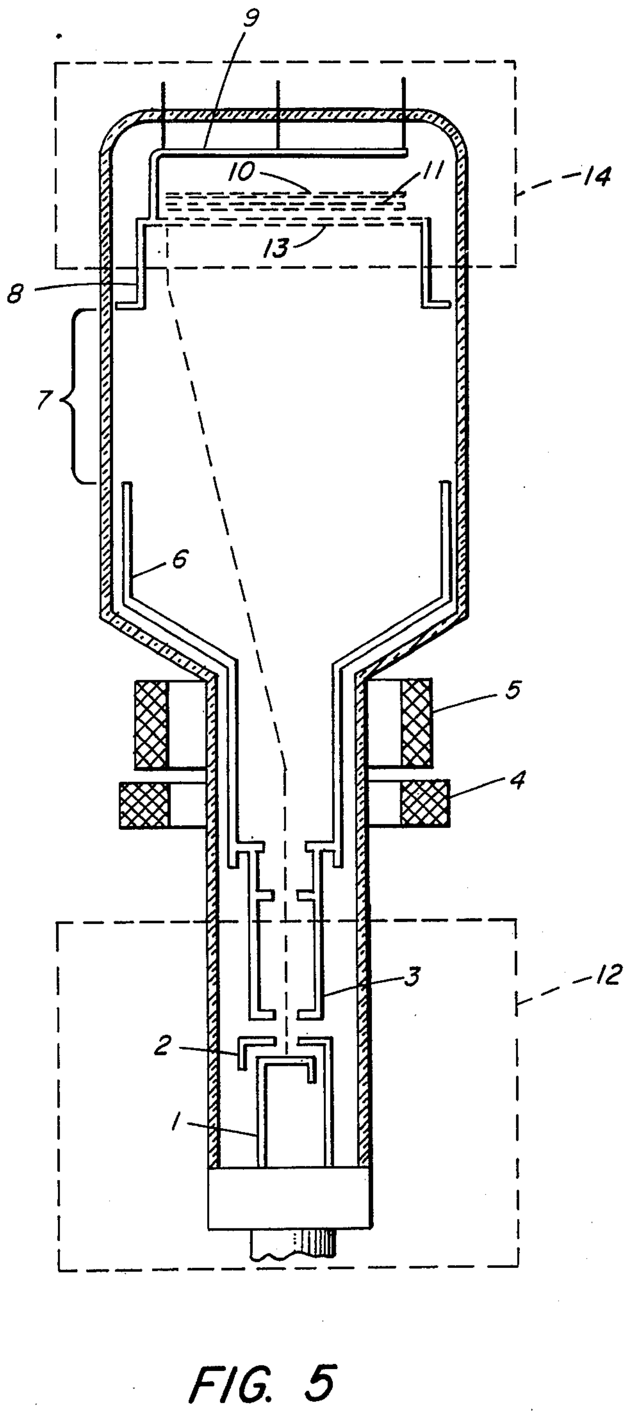
FIG. 5 shows an electron beam storage tube including the thin boron nitride dielectric storage target membrane.

Referring now to FIG. 5 of the drawings, there is shown an electron beam storage tube 13. The tube comprises an evacuated glass chamber with an electron gun 12 at one end and target electrode means 14 at the other end. An electron beam is formed in the usual manner by the gun 12. The gun includes a cathode 1, a grid 2, and an anode 3. Mediating the beam along its path in the conventional manner are magnetic focusing coil 14, deflection coil 5, and deceleration means 7.

Target electrode means 14 comprises a first screen 13 and a thin boron nitride membrane coating 11 intimately and contiguously contacting at least a portion of storage screen mesh 10. Signal electrode 9 forms a collector reflector to the beam and storage screen mesh membrane 10. The BN storage film does not require a layer of gold because the cross-over voltage is between 60 to 90 volts. In view of the fact that the conductive target electrode serves also as a metal substrate, meshes made out of nickel are useful for mounting the thin BN membrane. Molybdenum and tungsten meshes also exhibit good thermal expansion properties at elevated temperatures, thereby avoiding membrane wrinkling.

In the foregoing disclosure, an improved membrane type dielectric storage target has been shown, being shaped in conventional or topologic forms and further including a method for forming a conductive image of the mesh on an opposite or another surface portion by photo-resist, decoration, and breakdown techniques. It should be understood that this invention is not limited to the precise construction herein described in connection with the illustrative drawings but that other embodiments within the scope of the appended claims are to be considered within the purview of the invention.

What is claimed is:

1. A method for fabricating a dielectric storage target comprising the steps of:

coating a non-reactive electrically conductive metal wire mesh with a nitrocellulose layer;

depositing a thin boron nitride film on at least portions of said nitrocellulose layer;

heating the coated mesh to remove the nitrocellulose layer and to bond said boron nitride film to said mesh; and forming a pattern of conductive metal on portions of the surface of the boron nitride film opposite to portions of said metal comprising exposing a photo-sensitive layer deposited on said film to a pattern of light passing through the apertures in said mesh and through portions of said boron nitride film.

2. A method according to claim 1, wherein the conductive wire mesh is selected from at least one of the materials of the group consisting of nickel, tungsten, molybdenum, vanadium, and chromium.

3. A method for fabricating a dielectric storage target comprising the steps of:

coating a non-reactive conductive metal mesh with a lacquer layer;

depositing a thin refractory dielectric film substantially free from apertures of boron nitride on the mesh;

evaporating the lacquer layer by applying heat to the film covered mesh;

forming a mask having a pattern of the mesh on the opposite surface of the refractory dielectric film comprising exposing a photo-sensitive layer deposited on said film to a pattern of light passing through the apertures in said mesh and through portions of said boron nitride film; and depositing a conductive metal through said mask on portions of the surface of the refractory dielectric film opposite portions of said mask.

4. A method according to claim 3 wherein the formation of said mask comprises the steps of:

forming a photo-resist pattern from said photo-sensitive layer on the opposite surface of the dielectric film opposite the apertures in the wire mesh only;

depositing a thin conductive film on the opposite surface of the dielectric film; and chemically stripping the photo-resist while washing off the thin metal film from the areas opposite the apertures in the mesh.

* * * * *